(12) United States Patent
Mohanty et al.

(10) Patent No.: US 7,619,025 B2
(45) Date of Patent: Nov. 17, 2009

(54) BIODEGRADABLE POLYMERIC NANOCOMPOSITE COMPOSITIONS PARTICULARLY FOR PACKAGING

(75) Inventors: Amar K. Mohanty, Lansing, MI (US); Yashodhan Parulekar, Okemos, MI (US); Mariappan Chidambarakumar, Tamil Nadu (IN); Napawan Kositruangchai, East Lansing, MI (US); Bruce R. Harte, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 387 days.

(21) Appl. No.: 11/502,971

(22) Filed: Aug. 11, 2006

(65) Prior Publication Data

US 2007/0037912 A1   Feb. 15, 2007

Related U.S. Application Data

(60) Provisional application No. 60/707,625, filed on Aug. 12, 2005.

(51) Int. Cl.
  *C08K 3/34* (2006.01)
(52) U.S. Cl. .................. 524/445; 524/186; 524/447
(58) Field of Classification Search ................. 524/186, 524/445, 447
  See application file for complete search history.

(56) References Cited

U.S. PATENT DOCUMENTS

| | | | |
|---|---|---|---|
| 5,718,841 A * | 2/1998 | Mardis et al. ................. | 516/34 |
| 5,747,560 A | 5/1998 | Christiani et al. | |
| 5,883,199 A | 3/1999 | McCarthy et al. | |
| 2,006,518 A1 | 1/2002 | Lustig et al | |
| 6,337,046 B1 | 1/2002 | Bagrodia et al. | |
| 6,573,340 B1 | 6/2003 | Khemani et al. | |
| 6,787,613 B2 | 9/2004 | Bastioli et al. | |
| 7,173,080 B2 * | 2/2007 | Yamada et al. ............... | 524/445 |
| 7,241,832 B2 * | 7/2007 | Khemani et al. ............ | 524/537 |
| 7,265,188 B2 * | 9/2007 | Autran ....................... | 525/439 |
| 2002/0052445 A1 | 5/2002 | Terada et al. | |
| 2003/0166748 A1 | 9/2003 | Khemani et al. | |
| 2003/0166779 A1 | 9/2003 | Khemani et al. | |
| 2005/0043462 A1* | 2/2005 | Yamada et al. ............... | 524/445 |
| 2007/0241483 A1* | 10/2007 | Bastioli et al. ............... | 264/555 |

FOREIGN PATENT DOCUMENTS

| | | | |
|---|---|---|---|
| JP | 2002-3077724 | * | 10/2002 |
| WO | WO 2007/022080 A3 | * | 2/2007 |

OTHER PUBLICATIONS

Lim S. T. et al. Preparation and Characterization of Microbial Biodegradable Poly(3-hydroxybutyrate)/Organoclay Nanocomposite, Journal of Mateirals Science Letters 22, 2003, 299-302.*

Chang et al. Poly(lactic acid) Nanocomposites with Various Organoclays. I. Thermomechanical Properties, Morphology and Gas Permeability, Journal of Polymer Science: Part B, Polymer Physics, vol. 41, 94-103 (2003).*
Cloisite 25 A MSDS, Southern Clay Products, 2003.*
Cloisite 30B MSDS, Southern Clay Products, 2003.*
A. Mohanty, Nanotechnology for the Evnironment: Current Status and Future Prospects of Green Nanocomposites; Joachim Seminar Presentation, SUNY ESF Presentation, Oct. 2005.*
Faruk 0. Hybrid HDPE/Wood Flour/Montmorillonite Nanocomposites; Wood and Biofiber Platics Composites, May 2007.*
Kubies et al, Structure and Mechanical Properties of Poly(L-Lactide)/Layered Silicate Nanocomposties, European Polymer Journal 42 (2006) 888-899.*
D. Garlotto, J. Polymers and the Environment, vol. 9, No. 2, Apr. 2001, 63-84.
Ke, Y. et al., Applied Polymer Science, 71, 1139 (1999).
Y. Kumagai and Y. Doi, Polymer Degrad. Stab. 36 (1992) 241.
F. Gassner and A.J. Owen, Polymer 35 (1994) 2233.
Wang, Z. et al., Chem Mater. 10, 3769 (1998).
X. Shuai, Y. He, Y. Na, Y. Inoue, J. of App. Poly. Sci., 80, 2600-2608 (2001).
Z. Qui, T. lkehara, T. Nishi, Polymer 44 (2003) 2503-2508.
B. Immirzi, M. Malinconico, G. Orsello, S. Portofino, M.G. Volpe, J. Mat. Sci., 34 (1999) 1625-1639.
Y. Na, Y. He, N. I. Asakawa, N. Yoshie and Y. Inoue, Macromolecules 2002, 35, 727-735.
Giannelis, E.P., "Polymer layered silicate nanocomposites", Advanced Materials 8, 2935 (1996).
Vaia, R.A. et al., Chem. Mater., 5, 1694 (1993).
S.S. Ray, K. Yamada, M. Okamoto, K. Ueda, "New polylactide-layered silicate nanocomposites.2. Concurrent improvements of material properties, biodegradability and melt rheology", Polymer, 44, 857 (2003).
S. Ray et al., "Novel Porus Ceramic Material via Burning of Polylactide/Layered Silicate Nanocomposite", Nanoletters, 2, 423 (2002).
Maiti et al., "Renewable Plastics: Synthesis and Properties of PHB Nanocomposites", Polym. Mater. Sci. Eng., 88, 58-59 (2003).
H. Park et al., "Environmentally Benign Injection Molded "Green" Nanocomposite Materials form Renewablve Resources for Automotive Applications", 18th Annual Conference of American Society for Composite, 2003.
Alexandre, M. et al., "Polymer-layered silicate nanocomposites: preparation, properties and used of a new class of materials", Mater. Sci. Eng. R: Reports 28, 2, Year 2000.
Giannelis, E.P. et al., "Polymer-Silicate Nanocomposites: Model Systems for Confined Polymers and Polymer Brushes", Adv. Polym. Sci- 138, 107, year 1999.

(Continued)

*Primary Examiner*—Katarzyna Wyrozebski
(74) *Attorney, Agent, or Firm*—Ian C. McLeod

(57) ABSTRACT

Specific polymer blends of polylactic acid (PLA) and polyhydroxybutyrate (PHB) and poly-(butylenes adipate-co-terephthalate (PBAT) as a fatty acid quaternary ammonium modified clay. The blends are particularly useful for barrier packaging.

12 Claims, 10 Drawing Sheets

OTHER PUBLICATIONS

Gilman J.W. et al. "Flammability Properties of Polymer-Layered Silicate Nanocomposites. Polypropylene and Polystyrene Nanocomposites", Chem. Mater., 12, 1866, year 2000.

Messersmith, P.B. et al., Chem. Mater. 6, 1719, (1994).

Yano, K. et al., Polymer Science Part A: Polymer Chemistry, 31, 2493 (1993).

Tock, R., Advance in Polymer Technology, vol. 3, No. 3, 223-231. (1983).

Gassner, F. et al., Polymer International, vol. 39, No. 3 215-219 (1996).

Southern Clay Products, Product Bulletin/Cloisite, Cloisite 25A, Typical Physical Properties Bulletin. FF Conference, 1998.

Southern Clay Products, Product Bulletin/Cloisite, Cloisite 30B, Typical Physical Properties Bulletin. FF Conference, 1998.

Kamena, K., Southern Clay Products, Slides 1-61. FF Conference, 1998.

* cited by examiner

BIODEGRADABLE POLYMERIC NANOCOMPOSITE COMPOSITIONS PARTICULARLY FOR PACKAGING

CROSS-REFERENCE TO RELATED APPLICATIONS

This application claims priority to Provisional Application No. 60/707,625 filed Aug. 12, 2005, which is incorporated herein by reference in its entirety.

STATEMENT REGARDING FEDERALLY SPONSORED RESEARCH OR DEVELOPMENT

None

STATEMENT REGARDING GOVERNMENT RIGHTS

None

BACKGROUND OF THE INVENTION (1) Field of the Invention

This invention relates to a composition which comprises three materials: a biobased biodegradable polymer, a polylactic acid (PLA) or polyhydroxybutyrate (PHB), a petroleum-based biodegradable polymer (poly-(butylene adipate-co-terephthalate) (PBAT), and a fatty acid triglyceride quaternary ammonium salt modified nanoclay to develop a high-barrier, biodegradable material for packaging. The composition is formed by reactive blending, particularly extrusion.

(2) Description of Related Art

The exponential growth of the use of polymeric materials in everyday life has led to the accumulation of huge amounts of non-degradable waste materials across our planet. This growing threat to the environment has led to research in biodegradable materials as replacement for non-degradable, commonly used materials.

High barrier packaging is the most needed polymeric material for today's food industries. High barrier may be defined as "any material that is capable of preventing the ingress of another material, whether it is gas (mostly oxygen and water vapor) or flavor or aroma". High barrier packaging can comprise several layers (3 to 6 plastic layers or more) and various types of polymer films which provide properties such as extended shelf life for foods, cosmetics and pharmaceuticals.

The preferred methods of making high barrier packaging are: co-extrusion, lamination and coating. Problems, including de-lamination and migration, can lead to diffusion of toxic substances into food, and loss of package integrity, which results in loss of the food.

This invention uses biobased biodegradable polymers such as poly L-Lactide acid (PLLA) or polyhydroxybutyrate (PHB). These polymers have high stiffness and low elongation with high brittleness and can not be used to form films or flexible articles. Polylactic acid (PLA) is a stiff, rigid thermoplastic derived from renewable resources (like corn) and can be totally amorphous or semi crystalline in nature depending on the stereo purity of the polymer backbone (D. Garlotta, J. Polymers and the Environment, Vol. 9, No. 2, April 2001, 63-84). PHB is an enantiomerically pure polymer with a methyl substituent regularly along the backbone adjacent to the repeating methylene unit. (A. Fiechter, Plastics from Bacteria and for Bacteria: Poly (B-Hydroxyalkanoates) as Natural, Biocompatible, and Biodegradable Polyesters, Springer-Verlag, New York, 1990, p. 77-93). The structure of PHB is comparable with that of isotactic polypropylene (PP) and hence it has many similar properties like PP. The isotacticity combined with the linear nature of the chain results in a highly crystalline material with very attractive strength and modulus but very poor elongation.

Researchers have investigated the blending of hard polymers with tough polymers to achieve optimized properties and performances (U.S. Pat. No. 6,573,340 to Khemani et al; U.S. Patent Appln. No. 20030166748 to Khemani et al and U.S. Patent Appln. No. 20030166779 to Khemani). Blends of PLA with some biodegradable polymers such as poly(butylene succinate), poly-$\epsilon$-caprolactone and PBAT have been reported (U.S. Patent Appln. No. 20020052445 to Terada et al; U.S. Pat. No. 5,883,199 and U.S. Pat. No. 6,787,613 to Bastioli et al). Similarly, PHB blends with biodegradable polymers like poly(butylene succinate), poly-$\epsilon$-caprolactone, poly(ethylene glycol) and poly(ethylene oxide) have been reported (Y. Kumagai and Y. Doi, Polymer Degrad. Stab. 36 (1992). 241; F. Gassner and A. J. Owen, Polymer 35 (1994) 2233; M. Gada, R. A. Gross and S. P. McCarthy, in Biodegradable Plastics and Polymers," edited by Y. Doi and K. Fukuda (Elsevier Science B. V. 1994); X. Shuai, Y. He, Y. Na, Y. Inoue., J. of App. Poly. Sci., 80, 2600-2608 (2001); Z. Qui, T. Ikehara, T. Nishi, Polymer 44 (2003) 2503-2508; B. Immirzi, M. Malinconico, G. Orsello, S. Portofino, M. G. Volpe, J. Mat. Sci., 34 (1999) 1625-1639 and Y. Na, Y. He, N. I. Asakawa, N. Yoshie and Y. Inoue, Macromolecules 2002, 35, 727-735).

Development of polymer/clay nanocomposites (PCN's) is one of the latest examples in evolution of materials of superior properties as compared to their virgin forms (Giannelis, E. O., "Polymer layered silicate nanocomposites", Advanced Materials 8, 2935 (1996); Okada, O., Kawasumi, M., Usuki, A., Kurauchi, T., Kamigaito, O., Mater. Res. Soc. Symp. Proc. 171, 45 (1990); U.S. Pat. No. 5,747,560 to Christiani et al; Pinnavaia, T. J., Lan, T., Wang, Z., Shi, H., Kavaratna, P. D. ACS Symp. Ser. 622, 250 (1996); S. S. Ray, K. Yamada, M. Okamoto, K. Ueda, "New polylactide-layered silicate nanocomposites. 2. Concurrent improvements of material properties, biodegradability and melt rheology", Polymer, 44, 857 (2003); S. Ray et al., "Novel Porous Ceramic Material via Burning of Polylactide/Layered Silicate Nanocomposite", Nanoletters, 2, 423 (2002); P. Maiti et al., "Renewable Plastics: Synthesis and Properties of PHB Nanocomposites", Polym. Mater. Sci. Eng., 88, 58-59 (2003); H. Park et al., "Environmentally Being Injection Molded "Green" Nanocomposite Materials from Renewable Resources for Automotive Applications", 18$^{th}$ Annual Conference of American Society for Composite, 2003; and Alexandre, M. et al., "Polymer-layered silicate nanocomposites: preparation, properties and uses of a new class of materials", Mater. Sci. Eng. R: Reports, 28, 2). The incorporation of nanosize clay platelets into a material significantly decreases the permeation rate of penetrants through a polymer matrix by increasing the penetrant tortuosity. Nanocomposites show increase in heat distortion temperature, dimensional stability, improved barrier properties, flame retardancy, and enhanced physico/thermo-mechanical properties over conventional polymers (Giannelis, E. P. et al., "Polymer-Silicate Nanocomposites: Model Systems for Confined Polymers and Polymer Brushes", Adv. Polym. Sci., 138, 107; Gilman, J. W. et al., "Flammability Properties of Polymer-Layered-Silicate Nanocomposites. Polypropylene and Polystyrene Nanocomposites", Chem. Mater., 12, 1866; Messersmith, P. B. et al., Chem. Mater. 6, 1719, (1994); Yano, K. et al., Polymer Science Part A: Polymer Chemistry, 31, 2493, (1993); Vaia, R. A. et al., Chem.

Mater., 5, 1694 (1993); Wang, Z. et al., Chem. Mater. 10, 3769, (1998); Ke, Y. et al., Applied Polymer Science, 71, 1139, (1999) and Hasegawa, N. et al., J. Applied Polymer Science, 63, 137, (1997)). Polymer-clay nanocomposites are achieving rapid growth in packaging, even more than in automotive applications. Nanoclay technologies can improve a packaging material's oxygen-, carbon dioxide-, moisture- and odor-barrier characteristics.

Based on extensive examination of the literature, the following problems were identified with conventional high barrier packaging polymers:

(1) Non-biodegradable food packaging materials end up as municipal waste leading to environmental waste problems.
(2) Rising landfill costs and decreasing landfill space.
(3) Incineration leads to a net contribution to atmospheric $CO_2$.
(4) Conventional polymeric packaging is based on non-renewable resources and hence are not sustainable or eco-friendly and which leads to a need for alternative eco-friendly green materials that can replace these non-renewable-resource based non-biodegradable materials.
(5) Multilayer high barrier films have problems with delamination and high processing costs.
(6) Metallized coatings can not biodegrade nor be incinerated.

OBJECTS

It is an object of the present invention to provide a new composition of eco-friendly, biodegradable "green" nanocomposites having an appropriate stiffness-toughness balance with improved barrier properties to replace or substitute for non-biodegradable fossil fuel derived plastics for packaging applications.

SUMMARY OF THE INVENTION

The present invention relates to a composition which comprises: a reactively blended mixture of (a) a first polymer selected from the group consisting of polyhydroxybutyrate (PHB) and polylactic acid (PLA) and mixtures thereof; (b) a second polymer which is poly-(butylene adipate-co-terephthalate (PBAT), wherein the weight ratio of (a) to (b) is between about 70 and 30 and 30 and 70 wherein the composition has a percent elongation in the break of between 6 and 568% and an Izod impact between about 87 and 665 J/m; and (c) a fatty acid triglyceride tri-substituted or unsubstituted alkylene group quaternary ammonium salt modified clay in an amount between about 1 and 10% by weight of (a) and (b). Preferably, the composition is as a blown film or as a molded product. Further, the composition preferably comprises a clay comprising a saturated fatty acid trialkyl quaternary ammonium salt. Still further, the composition preferably comprises tallow as the fatty acid modified clay. More preferably, the composition comprises a clay which has been organically modified wherein the quaternary ammonium salt has 6 to 23 carbon atoms in the fatty acid and each alkylene group has 1 to 10 carbon atoms. Further still, the composition is preferably the clay modified with a methyl tallow bis-2-hydroxyethyl quaternary ammonium or methyl hydrogenated tallow, 2-ethylhexyl quaternary ammonium salt compound as the salt. Preferably, the composition comprises the clay in an amount between about 2% and 7% by weight of the composition and providing a water and an oxygen transmission barrier as a film laminated to other polymers which have greater transmission of oxygen and water.

Preferably, the first polymer is PHB alone. Also preferably, the composition wherein the first polymer is PLA alone. Preferably, the first polymer is a pure L isomeric form of the PLA. Preferably, the composition has been reactively blended by extrusion. Finally, preferably the composition wherein the salt contains a methyl sulfate anion.

DESCRIPTION OF THE PREFERRED EMBODIMENTS

The polymer/clay composites in this invention have diverse uses due to their improved barrier properties and enhanced physico/thermo-mechanical properties. The objectives of this invention are: (i) to blend PHB or PLLA with PBAT (ii) to create a material with balanced stiffness/toughness (iii) to incorporate specific clay into the optimum blend composition so as to create nanocomposites, and (iv) to fabricate nanocomposites for packaging applications.

This invention uses specific surface-modified clays as the nanoclay reinforcement to be compatible with the blend matrix to the optimum extent. All the above factors synergistically combine to create a flexible-strong material with high/ good barrier and improved thermo-mechanical properties.

1. Details of Invention

Materials

TABLE 1

| Information on materials used | | | |
|---|---|---|---|
| Material | Name | Tradename | Supplier |
| Poly-L-lactide acid | PLLA | Biomer ® L9000 | Biomer, Germany |
| Polyhydroxybutyrate | PHB | Biomer ® P-226 | Biomer, Germany |
| Poly-(butylenes adipate-co-terephthalate) | PBAT | Ecoflex ® F (BX7011) | BASF AG, Germany |
| Organically modified montmorillonite | OMMT* | CLOISITE ® 30B | Southern Clay Products Inc Gonzales, TX |
| Organically modified montmorillonite | OMMT* | CLOISITE ® 25A | Southern Clay Products Inc Gonzalez, TX |

*The ammonium cation of CLOISITE ® 30B, is methyl, tallow bis-2-hydroxyethyl quaternary ammonium with a chloride anion while for CLOISITE ® 25A, it is tallow, 2-ethylhexyl quaternary ammonium with a methyl sulfate anion.

The quaternary ammonium cation which is the most effective is a saturated fatty acid (C6 to C23) triglyceride-trialkyl (1 to 10-carbon atoms) quaternary with an anion. CLOISITE® 25A is most preferred. The clays are believed to be exfoliated by the polymer mixture.

Figure 1:
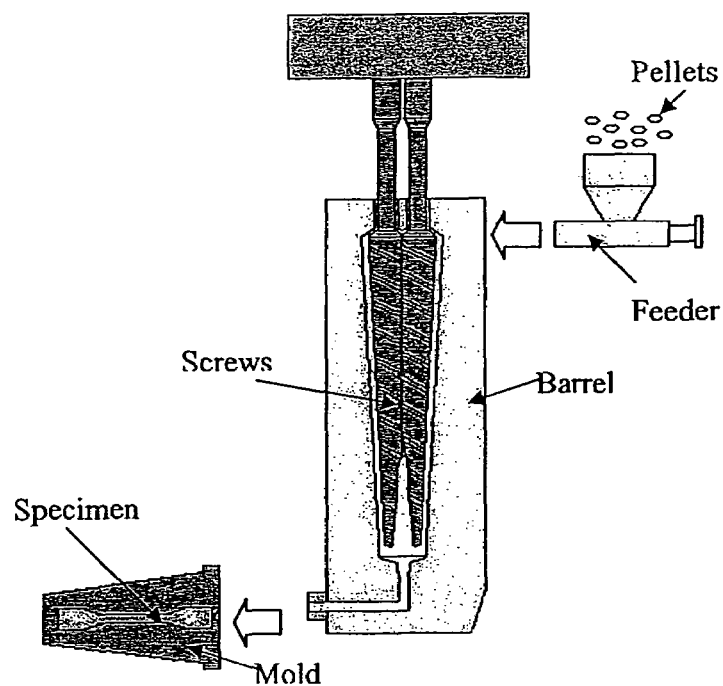
FIG. 1 is a schematic representation of DSM microcompounder extruder used for laboratory-scale blending and injection molding.

Equipment:

Laboratory scale extruder/injection molder: The polymer melt compounding by twin-screw extrusion was carried out in a micro twin screw extruder with an injection molder system (TS/I-02, DSM, Netherlands). The mini extruder is equipped with conical co-rotating screws having length of 150 mm, with L/D ratio of 18 and net capacity of 15 cc (Schematic in FIG. 1). An attached injection-molding unit is capable of 160-psi injection force. After extrusion, the melted materials were transferred through a preheated cylinder to the mini injection molder to obtain the desired specimen samples for various measurements and analysis.

Compression molding machine: (Model: Carver) was used to prepare films prior to measuring the barrier properties.

Twin Screw Extruder: Co-rotating twin screw extruder with metered feeders: CX Century Extruder (Model OX-30) was used for full-scale melt compounding of PHB/PLLA with PBAT blends and their nanocomposites.

Blown Film Extruder: Single screw extruder with blown film line (Killion Extruders. Inc., NJ) was used to make blown film.

Processing:

Laboratory Scale Blending/Injection Molding:

The materials were blended in the DSM twin screw extruder. The pellets (PLLA/PHB) were dried in the vacuum oven before processing whereas PBAT was used as such without drying. Clays were pre-dried at 60° C. for about 4-6 hours in an oven prior to processing.

Sample compositions and process parameters used for PLLA-PBAT and their nanocomposites are shown in Table 2.

TABLE 2

Blending compositions and process parameters used in DSM
Microcompounder for PLLA/PBAT/Clay (CLOISITE ® 30B/25A)
melt mixing

| PLLA/PBAT/clay | Screw speed (rpm) | Cycle time (mins) | Temperature (Top-Center-Bottom) (° C.) | Mold Temperature (° C.) | Injection Pressure (psi) |
|---|---|---|---|---|---|
| 100/0/0 | 100 | 5 | 185—185—185 | 55 | 120 |
| 70/30/0 | 100 | 5 | 185—185—185 | 54 | 120 |
| 60/40/0 | 100 | 5 | 185—185—185 | 53 | 120 |
| 50/50/0 | 100 | 5 | 185—185—185 | 53 | 120 |
| 30/70/0 | 100 | 5 | 185—185—185 | 52 | 100 |
| 0/100/0 | 100 | 5 | 150—150—150 | 50 | 90 |
| 95/0/5 | 150 | 8 | 185—185—185 | 55 | 120 |
| 0/95/5 | 100 | 6 | 150—150—150 | 50 | 120 |
| 0/80/20** | 150 | 4 | 150—150—150 | — | — |
| 66.5/28.5/5*** | 150 | 6 | 185—185—185 | 54 | 120 |
| 57/38/5*** | 150 | 6 | 185—185—185 | 53 | 120 |
| 47.5/47.5/5*** | 150 | 6 | 185—185—185 | 52 | 120 |

**for the master batch preparation,
***from the master batch, (all compositions are in weight %)

Compression Molding:

A compression molding machine was used to prepare films from pre-blended pellets prepared from the microcompounder twin screw extruder. These films were prepared for the barrier properties measurements. The blending compositions and process parameters followed to prepare the films are shown in Table 3. PHB films were compression molded at 180° C. with pressure of 185-210 psi for 3 minutes.

TABLE 3

Blending compositions and process parameters used in
the compression molding machine for making
PLLA/PBAT/nanocomposite based films

| PLLA/PBAT/clay (CLOISITE ® 25A) | Samples Size (g) | Residence Time (minutes) (x + y)* | Mold Temperature (° C.) | Compression Pressure (psi) |
|---|---|---|---|---|
| 100/0/0 | 4 | 2 + 3 | 190 | 185-210 |
| 70/30/0 | 4 | 1 + 3 | 190 | 185-210 |
| 60/40/0 | 4 | 1 + 3 | 190 | 185-210 |
| 0/100/0 | 4 | 0 + 3 | 150 | 185-210 |
| 66.5/28.5/5# | 3.5 | 1 + 3 | 190 | 148-173 |
| 57/38/5# | 3.5 | 1 + 3 | 190 | 148-173 |

These pellets were prepared by the master batch method using DSM.
*Residence time includes the time involved in softening (x = preheating without any pressure in between the molds) and the compression time (y) i.e., (x + y) minutes. (all compositions are in weight %)

Large-Scale Blending:

Large-scale blending was carried out using a twin screw extruder. PHB/PLLA and PBAT pellets were placed into the blend resin feeder. For the nanocomposites, clay was put into the clay feeder. Small feeding screws were used to control the feed rate for resin and clay. The materials were melted and mixed in the extruder section and forced through the die as strands. These melt compounded strands were then collected on the aluminum sheets mounted on the table to dry in the air for the PLLA/PBAT blend and its nanocomposite. After the strands were air dried, they were pelletized using the pelletizer machine and/or granulator to make the strands into pellets/granules. Water cooling was used to cool the melt compounded strands that were cut into pellets using a pelletizer for the PHB/PBAT blends and their nanocomposites. The process parameters followed for various PLLA/PBAT compositions and their nanocomposites were shown in Table 4. The temperature profiles of PHB/PBAT blends and their nanocomposites made in the twin screw extruder are shown in Table 5.

TABLE 4

Blending compositions and process parameters followed in
Twin Screw Extruder for PLLA/PABT blend and its
nanocomposite (CLOISITE ® 25A)

| Zone | 60PLLA/40PBAT Temperature (° C.) | 80PBAT/20 CLOISITE ® 25A (for master batch) Temperature (° C.) | 57PLLA/38PBAT/ 5 CLOISITE ® 25A Temperature (° C.) |
|---|---|---|---|
| Zone-1 | 15 | 15 | 15 |
| Zone-2 | 130 | 130 | 130 |
| Zone-3 | 150 | 150 | 150 |
| Zone-4 | 165 | 165 | 165 |
| Zone-5 | 170 | 170 | 170 |
| Zone-6 | 170 | 170 | 170 |
| Zone-7 | 170 | 170 | 170 |
| Zone-8 | 165 | 165 | 165 |
| Zone-9 | 160 | 160 | 160 |
| Die | 150 | 150 | 150 |
| Screw Speed (rpm) | 150 | 150 | 150 |

Note:
all compositions are in weight %

TABLE 5

Temperature profiles used for blending PHB/PBAT Blends and
their Nanocomposites (CLOISITE ® 30B)
using Twin Screw Extruder

| Zone | PHB/PBAT blends (30/70, 40/60, 50/50, 70/30)* Temperature (° C.) | PHB/PBAT blends with 5% CLOISITE ® 30B (28.5/66.5, 38/57, 47.5/47.5, 66.5/28.5)* Temperature (° C.) |
|---|---|---|
| zone 1 | 15 | 15 |
| zone 2 | 130 | 150 |
| zone 3 | 150 | 165 |
| zone 4 | 165 | 170 |
| zone 5 | 175 | 180 |
| zone 6 | 175 | 180 |

TABLE 5-continued

Temperature profiles used for blending PHB/PBAT Blends and their Nanocomposites (CLOISITE ® 30B) using Twin Screw Extruder

| Zone | PHB/PBAT blends (30/70, 40/60, 50/50, 70/30)* Temperature (° C.) | PHB/PBAT blends with 5% CLOISITE ® 30B (28.5/66.5, 38/57, 47.5/47.5, 66.5/28.5)* Temperature (° C.) |
|---|---|---|
| zone 7 | 175 | 180 |
| zone 8 | 175 | 180 |
| zone 9 | 175 | 180 |
| Die | 175 | 180 |
| Screw speed (rpm) | 120 | 150 |

*All compositions are in weight %

Blown Film Extrusion:

Blown film extrusion is a continuous process in which the polymer pellets are melted in the extruder and converted into film. The melted material in the extruder is forced through an annular die and the polymer preform is inflated with air into a bubble. The film is stretched biaxially and collapsing frames transform the bubble into a flat film. The nip section provides the stretch in the machine direction and transports the film up to the tower and then to the winder. The blown films with better transparency and orientation for the PLLA/PBAT blend and its nanocomposite were obtained at the nip-roll speed of 25 fpm. The process parameters followed in this blown film making for the neat-PBAT, PLLA/PBAT blend and its nanocomposite are given in Table 6. Temperature profiles of PHB/PBAT Blends and their nanocomposites using blown film extruder are shown in Table 7.

TABLE 6

Blending compositions and process parameters followed in the blown film extruder for PLLA/PABT blend and its nanocomposite (CLOISITE ® 25A)

| Zone | 60PLLA/40PBAT Temperature (° C.) | 57PLLA/38PBAT/ 5 CLOISITE ® 25A Temperature (° C.) | Neat PBAT Temperature (° C.) |
|---|---|---|---|
| Zone-1 | 210 | 210 | 177 |
| Zone-2 | 216 | 216 | 182 |
| Zone-3 | 210 | 210 | 182 |
| Clamp Ring | 199 | 199 | 177 |
| Adaptor | 199 | 199 | 177 |
| Die-1 | 188 | 188 | 162 |
| Die-2 | 188 | 188 | 154 |
| Screw Speed (rpm) | 15 | 15 | 15 |
| Winding Speed (rpm) | 50/60 | 50/60 | 50/60 |

Note:
All compositions are in weight %

TABLE 7

Temperature profiles of PHB/PBAT Blends and their Nanocomposites (CLOISITE ® 30B) used in the Blow Film Extruder

| Zone | PHB/PBAT blends (30/70, 40/60, 50/50, 70/30)* Temperature (° C.) | PHB/PBAT blends with 5% CLOISITE ® 30B (28.5/66.5, 38/57, 47.5/47.5, 66.5/28.5)* Temperature (° C.) |
|---|---|---|
| zone 1 | 177 | 177 |
| zone 2 | 182 | 185 |
| zone 3 | 182 | 185 |
| Clamping | 177 | 182 |
| Adaptor | 174 | 174 |
| Die1 | 154 | 160 |
| Die2 | 149 | 154 |
| Screw speed (rpm) | 25 | 20 |
| Winding Speed (rpm) | 50/60 | 50/60 |

*All compositions are in weight %

Characterization

Thermo-Physical Properties:

Modulus measurements were obtained on a dynamic mechanical analyzer (Q800 DMA), (TA instruments, DE). Dual cantilever mode was used for injection-molded samples whereas tension mode was used for blown film samples.

Mechanical Properties:

Notched Izod Impact strength of the injection molded materials was measured according to ASTM D256 using a Testing Machines Inc. 43-02-01 Monitor/Impact machine with a 5 ft-lb pendulum. The samples were notched and conditioned for 48 hours before testing.

Universal Tester (INSTRON) model 5565 was used for measuring tensile strength, modulus of elasticity and the percent elongation of the blown films following the ASTM standard D-882-97. The sample width of 0.5 inch/1 inch and the gauge length of 2 inches with a grip separation speed of 2 in/min (except for neat PLLA with speed of 0.5 in/min and neat PBAT with speed of 20 in/min) were used. The tensile properties of the injection-molded materials were measured with the United Testing System SFM-20 according to ASTM D 638.

Barrier Properties:

The Oxygen Transmission Tester (OXTRAN) model 2/21 from Mocon was used to measure the oxygen permeability of the films. Samples were cut from the blown and compression molded films and then mounted onto the cells. The samples were tested at 23° C., 0% RH and 740 mmHg.

The Water Vapor Transmission Tester (PERMATRAN) model W3/31 from Mocon was used to determine the water vapor permeability of film samples. Samples were cut from the blown and compression molded films and then mounted onto the cells. The blown films made from PHB/PBAT blends and their nanocomposites, were tested at 37.8° C., 100% RH and 740 mmHg where as the blown films and the compression molded films made from PLLA/PBAT blends and their nanocomposites were tested at 37.8° C., 85% RH and 740 mmHg.

Results and Discussion

PLLA-PBAT Blends and their Nanocomposites with CLOISITE® 25A/30B (Injection Molded Rigid Samples)

Figure 2:
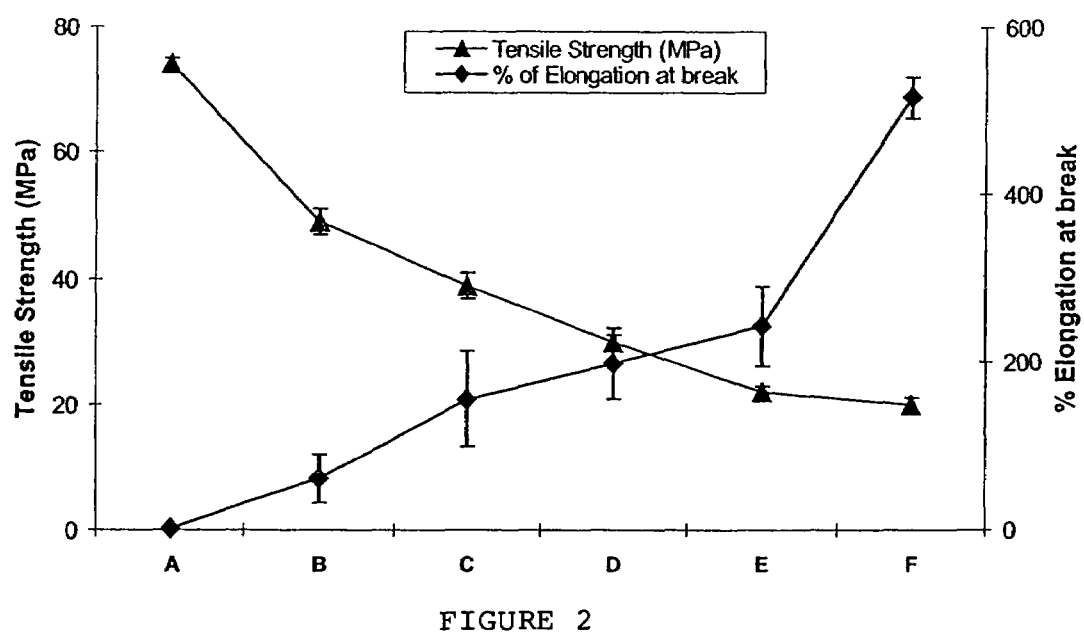
FIG. 2 is a graph showing tensile strength and elongation for PLA-PBAT blends A) Neat PLLA, B) 70% PLLA+30% PBAT, C) 60% PLLA+40% PBAT, D) 50% PLLA+50% PBAT, E) 30% PLLA+70% PBAT, F) Neat PBAT (all compositions are in weight %).
Figure 3:
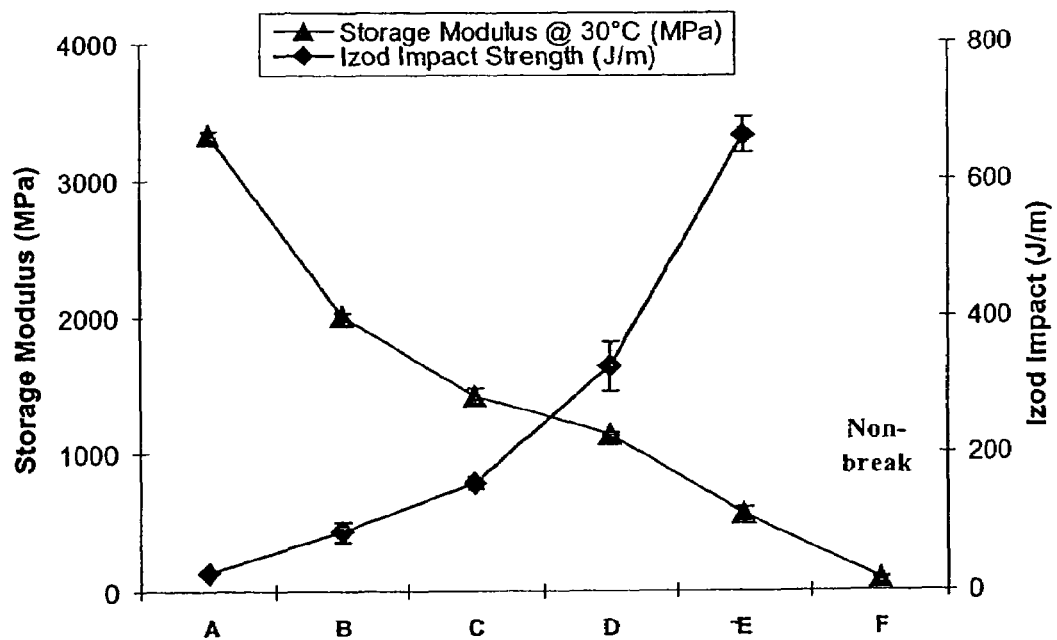
FIG. 3 is a graph showing notched izod impact strength and storage moduli (from DMA) for PLA-PBAT blends A) Neat PLLA, B) 70% PLLA+30% PBAT, C) 60% PLLA+40% PBAT, D) 50% PLLA+50% PBAT, E) 30% PLLA+70% PBAT and F) Neat PBAT (all compositions are in weight %).

PLLA is an intrinsically brittle polymer with a very low percent elongation (~2%) and a low impact strength (28 J/m). Addition of flexible PBAT to PLLA was successful in increasing the flexibility and toughness (FIG. 2). The 60:40 wt. % PLLA/PBAT blend gave ideal elongation (157%) for film applications balanced by requisite modulus, tensile strength and impact strength (FIG. 3).

Figure 4:
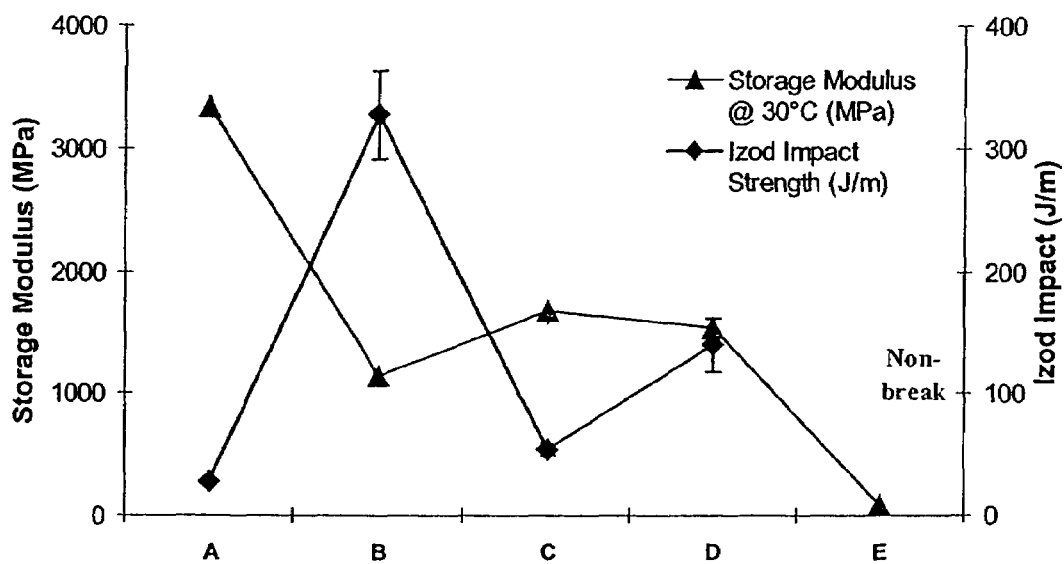
FIG. 4 is a graph showing a comparison of notched izod impact strength and storage moduli (from DMA) for CLOISITE® 30B and 25A A) Neat PLLA, B) 50% PLLA+ 50% PBAT, C) 47.5% PLLA+47.5% PBAT+5% CLOISITE® 30B, D)47.5% PLLA+47.5% PBAT+5% CLOISITE® 25A and E) Neat PBAT (all compositions are in weight %).
Figure 5:
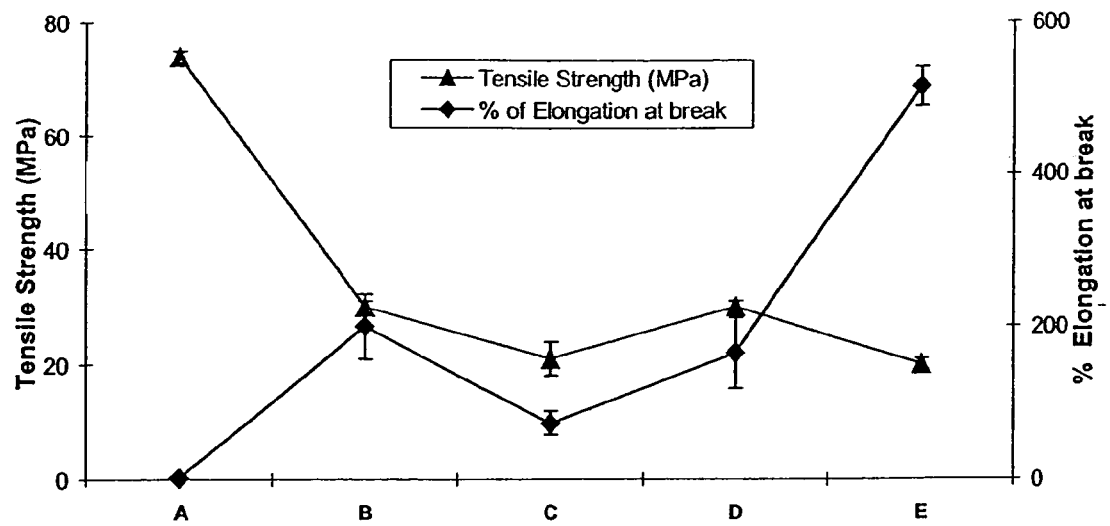
FIG. 5 is a graph showing a comparison of tensile strength and % elongation for CLOISITE® 30B and 25A A) PLLA, B) 50% PLLA+50% PBAT, C) 47.5% PLLA+47.5% PBAT +5% CLOISITE® 30B, D) 50% PLLA+50% PBAT+5% CLOISITE® 25A and E) 100 PBAT (all compositions are in weight %).

Nanocomposites were made using two different clays; CLOISITE® 30B and CLOISITE® 25A having different surface modifications. CLOISITE® 30B did not show any positive effect on the PLLA-PBAT blends. CLOISITE® 25A has a specific surface modification which was very successful in improving the properties of the blends and this is a significant breakthrough as evidenced by increase in elongation, impact and tensile strength (FIGS. 4 and 5).

Figure 6:
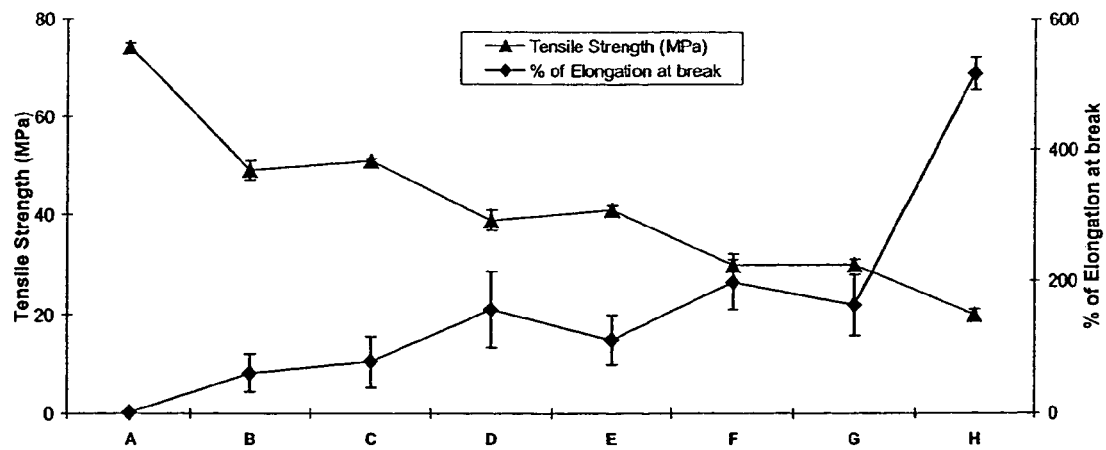
FIG. 6 is a graph showing tensile strength and elongation for PLLA-PBAT blends and their nanocomposites A) Neat PLLA, B) 70% PLLA+30% PBAT, C) 66.5% PLLA+28.5% PBAT+5% CLOISITE® 25A, D) 60% PLLA+40% PBAT, E) 57% PLLA+58% PBAT+5% CLOISITE® 25A, F) 50% PLLA+50% PBAT, G) 47.5% PLLA+47.5% PBAT+5% CLOISITE® 25A, H) Neat PBAT (all compositions are in weight %).
Figure 7:
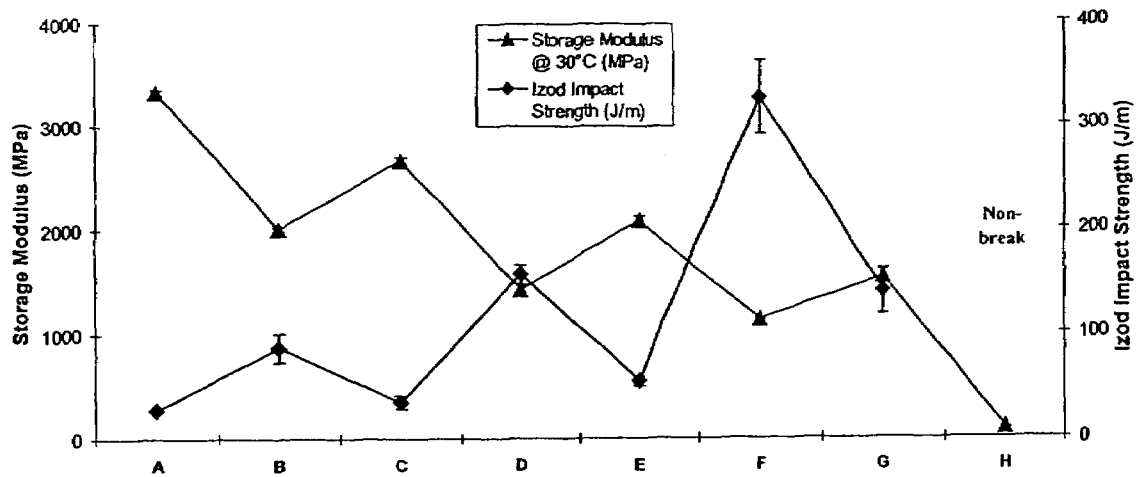
FIG. 7 is a graph showing storage Modulus at 30° C. and notched Izod impact strength for PLLA-PBAT blends and their nanocomposites A) Neat PLLA, B) 70% PLLA+30% PBAT, C) 66.5% PLLA+28.5% PBAT+5% CLOISITE® 25A, D) 60% PLLA+40% PBAT, E) 57% PLLA+58% PBAT+5% CLOISITE® 25A, F) 50% PLLA+50% PBAT, G) 47.5% PLLA+47.5% PBAT+5% CLOISITE® 25A, H) Neat PBAT (all compositions are in weight %).

Nanocomposites were made with 5 wt. % CLOISITE® 25A clay having the following compositions: 66.5% PLLA+ 28.5% PBAT+5% CLOISITE® 25A, 57% PLLA+38% PBAT+5% CLOISITE® 25A and 47.5% PLLA+47.5% PBAT+5% CLOISITE® 25A. The tensile strength, impact strength, modulus and percent elongation at break results (FIGS. 6 and 7) suggest that both 57% PLLA+38% PBAT+ 5% CLOISITE® 25A and 47.5% PLLA+47.5% PBAT+5% CLOISITE® 25A nanocomposites have requisite properties for film applications. The 57% PLLA+38% PBAT+5% CLOISITE® 25A nanocomposites was selected for further investigation based on its higher bio-content (more PLLA) and ideal mechanical properties.

Barrier Properties of Films (Extrusion Followed by Compression Molding)

Figure 8:
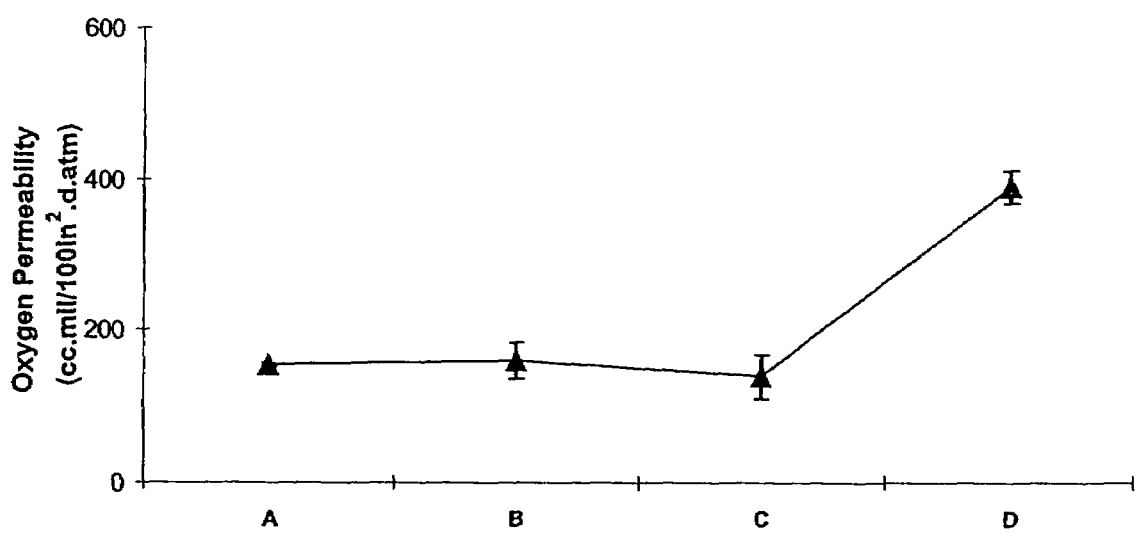
FIG. 8 is a graph showing a comparison of oxygen barrier properties of PLLA/PBAT blends and their nanocomposites blends A)Neat PLLA, B) 60% PLLA+40% PBAT, C) 57% PLLA+38% PBAT+5% CLOISITE® 25A, D) Neat PBAT (all compositions are in weight %).
Figure 9:
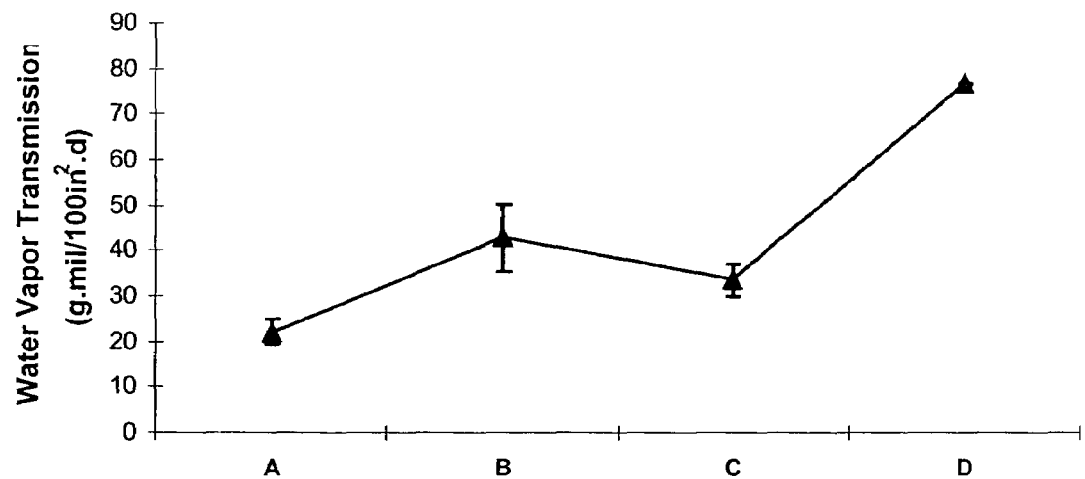
FIG. 9 is a graph showing comparison of water vapor barrier properties of PLLA/PBAT blends and their nanocomposites, A ) Neat PLLA, B) 60% PLLA+40% PBAT, C) 57% PLLA+38% PBAT+5% CLOISITE® 25A, D) Neat PBAT (all compositions are in weight %).

The barrier properties (FIGS. 8 and 9) of the selected compression molded films (PLLA 60 wt. %/PBAT 40 wt. % and its nanocomposite with 5 wt. % CLOISITE® 25A) were tested on the OXTRAN and PERMATRAN and compared with conventional polymers (Table 8).

TABLE 8

Oxygen and Water permeability values of conventional polymers (R. W. Tock, "Permeabilities and Water Vapor Transmission Rates for Commercial Polymer Films", 3, 3, Advances in Polymer Technology, (1983)). (LDPE: Low Density Polyetehylene, HDPE: High Density Polyetehylene, OPP: Oriented Polypropylene, PS: Polystyrene, PET: Polyethylene Terephthlate)

|  | Oxygen Permeability 25° C. (cc · mil/100 in² · d · atm) | Water Vapor Permeability @ 38° C. & 50-100% RH (g · mil/100 in² · d.) |
|---|---|---|
| LDPE | 500 | 1.3 |
| HDPE | 185 | 0.3 |
| OPP | 135 | 0.33 |
| PS | 330 | 8.5 |
| PET | 4.5 | 1.2 |
| Oriented Nylon6 | 1.3 | 10.5 |

PLLA-PBAT Blend and its Nanocomposite with CLOISITE® 25A (Blown Film Samples)

Figure 10:
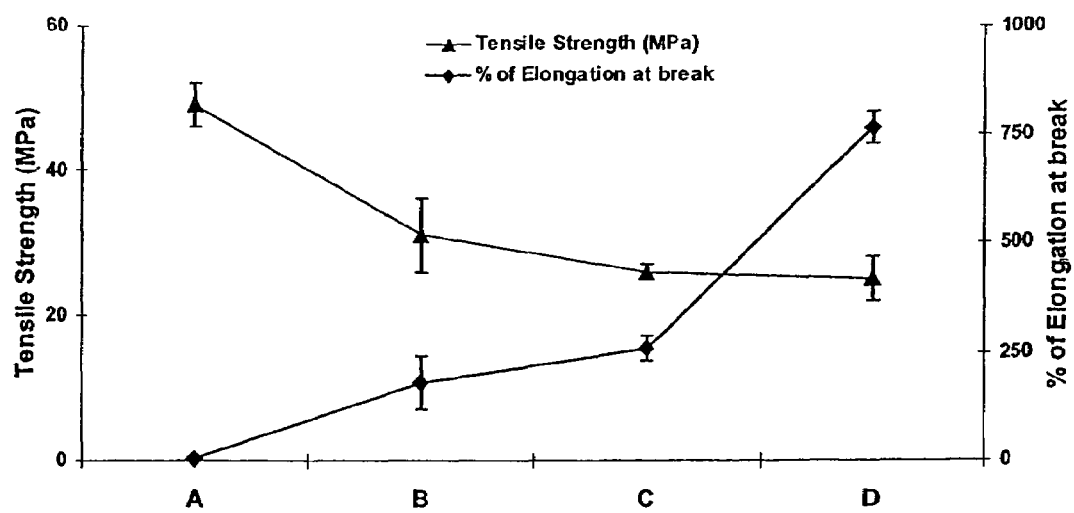
FIG. 10 is a graph showing a comparison of tensile properties of the blown film of PLLA/PBAT blend and its nanocomposite, A) Neat PLLA (compression molded film), B) 60% PLLA+40% PBAT, C) 57% PLLA+38% PBAT+5% CLOISITE® 25A, D) Neat PBAT (all compositions are in weight %).
Figure 11:
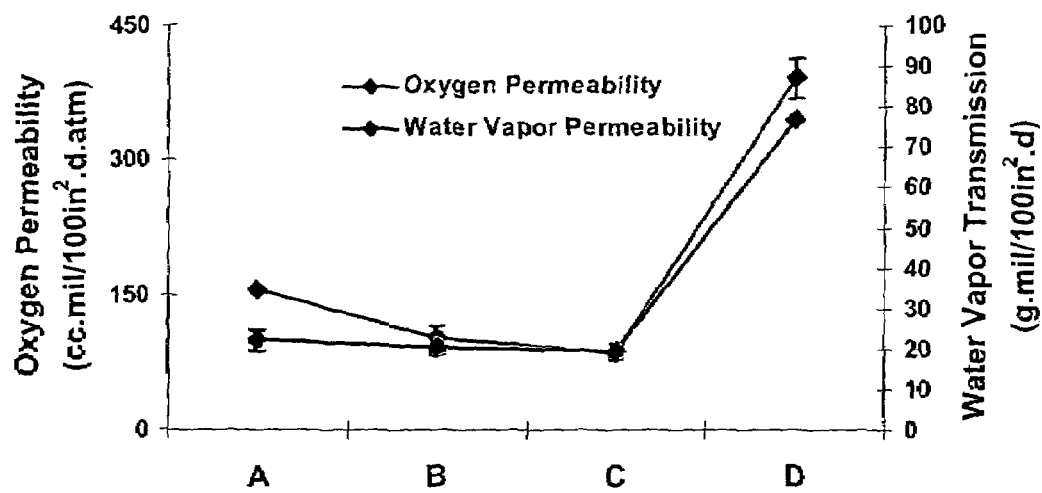
FIG. 11 is a graph showing a comparison of barrier properties of the blown film of PLLA/PBAT blend and its nanocomposite, A) Neat PLLA (compression molded film), B) 60% PLLA+40% PBAT, C) 57% PLLA+38% PBAT+5% CLOISITE® 25A, D) Neat PBAT (compression molded film) (all compositions are in weight %).
Figure 12:
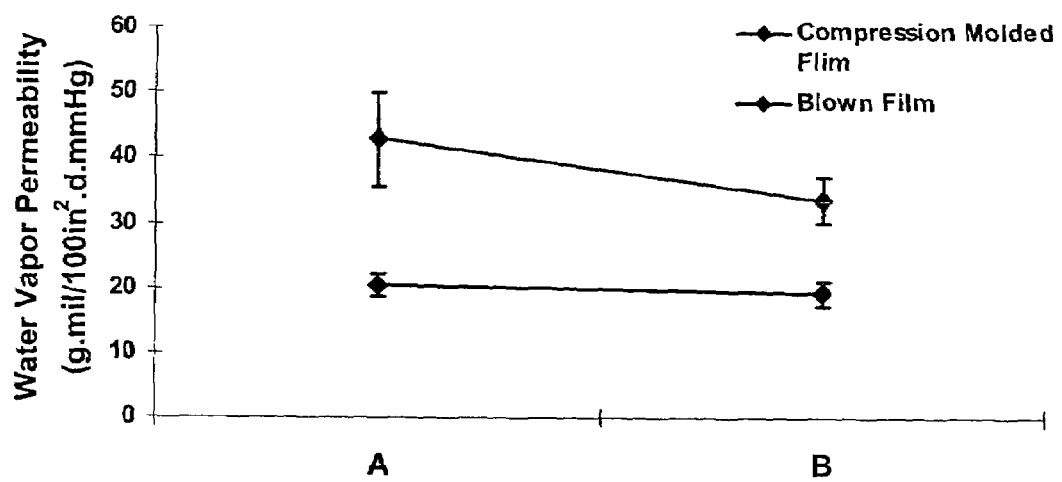
FIG. 12 is a graph showing comparison of water vapor barrier properties of the blown film and compression molded film for the PLLA/PBAT blend and its nanocomposite, A) 60% PLLA+40% PBAT, B) 57% PLLA+38% PBAT+5% CLOISITE® 25A (all compositions are in weight %).
Figure 13:
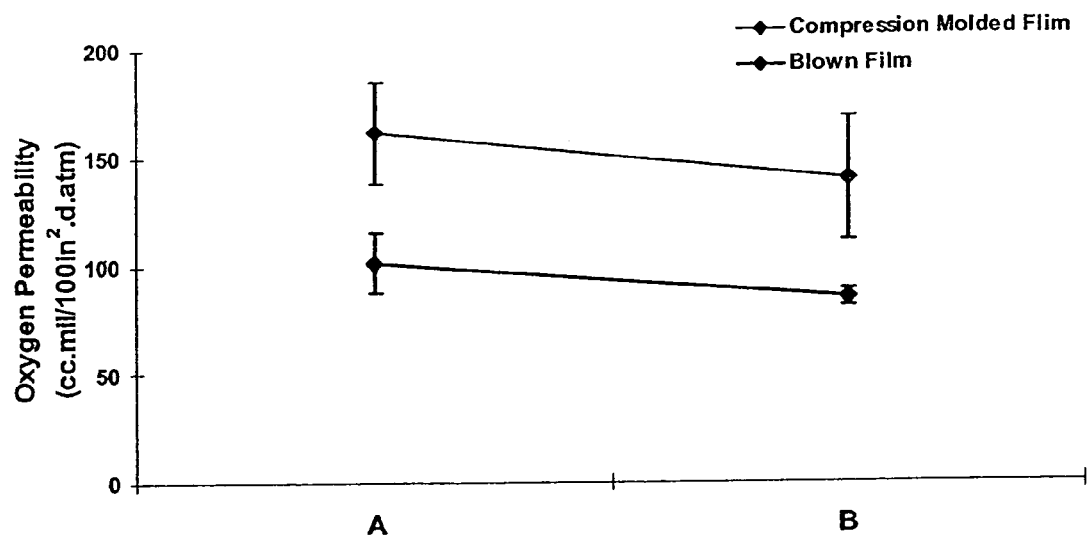
FIG. 13 is a graph showing a comparison of oxygen barrier properties of the blown film and compression molded film for the PLLA/PBAT blend and its nanocomposite, A) 60% PLLA+40% PBAT, B) 57% PLLA+38% PBAT+5% CLOISITE® 25A (all compositions are in weight %)

Based on the above analysis of injection molded rigid samples and compression molded film samples, blown film samples were prepared from the pellets made from the twin screw extruder for 60 wt % PLLA/40 wt % PBAT blend and its nanocomposite with 5 wt % CLOISITE® 25A. Tensile properties and barrier properties were evaluated for the same (FIGS. 10 and 11). Percent elongation of the nanocomposite film was better (40% improvement) than that of neat blend film; however, tensile strength was reduced (16% reduction) for the nanocomposite film. Water vapor barrier was improved by ~6% while oxygen barrier improved by ~16% for the nanocomposite blown film when compared to the respective neat blend blown film. However, water vapor barrier properties of the neat blown films showed ~53% improvement and nanocomposites blown film showed ~43% improvements over corresponding compression molded films (FIG. 12). Oxygen barrier properties of the blown films also showed ~37% improvement for the neat blend and ~39% improvements for the nanocomposite blown film when compared to the corresponding compression molded films (FIG. 13). These effects can -be attributed to the biaxial orientation effects in the blown films process.

The oxygen barrier of the PLLA/PBAT blended blown film is better than that of oriented polyolefins and polystyrene (Table 8). The nanocomposite further improves the barrier making it definite choice over the polystyrene and oriented polypropylene, common packaging materials.

PHB-PBAT Blends and their Nanocomposites with CLOISITE® 30B (Blown Film Samples)

PHB is isotactic in nature and combined with its chain linearity results in a highly crystalline material with very attractive strength and modulus but very poor elongation (~3%) and low impact strength (23 J/m).

PHB films can not be made by conventional processing due to their low elongation. PBAT was blended with PHB to increase its elongation and thus make it feasible to process blown film and also addition of flexible PBAT to PHB was successful in increasing the toughness.

Figure 14:
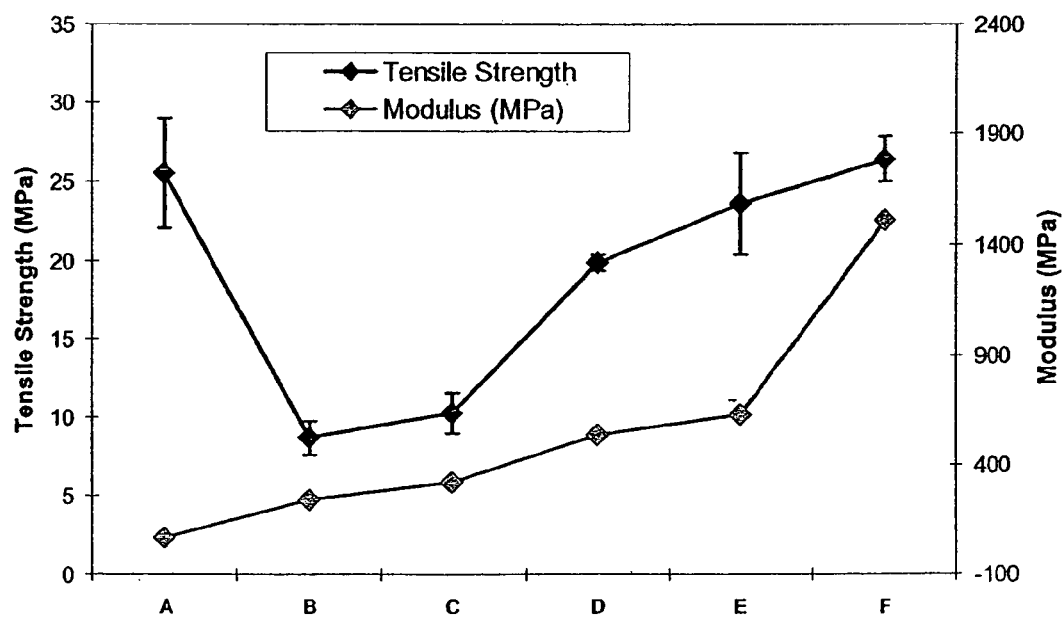
FIG. 14 is a graph showing tensile strength and modulus of PHB-PBAT blends A) Neat PBAT, B) 30% PHB+70% PBAT, C) 40% PHB+60% PBAT, D) 50% PHB+50% PBAT, E) 70% PHB+30% PBAT and F) Neat PHB (all compositions are in weight %).

FIG. 14 shows the tensile strength and modulus of PHB/PBAT blends. Modulus of PBAT (68 MPa) is very low compared to PHB (1514 MPa). PHB/PBAT blends show increase in modulus corresponding to the amount of PHB added.

Figure 15:
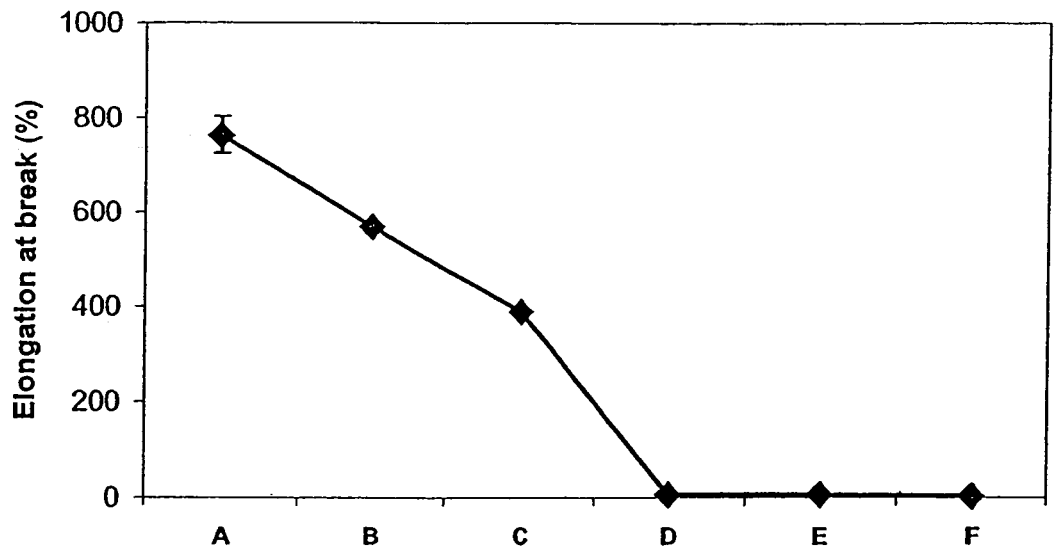
FIG. 15 is a graph showing tensile elongation of PHB-PBAT blends A) Neat PBAT, B) 30% PHB+70% PBAT, C) 40% PHB+60% PBAT, D) 50% PHB+50% PBAT, E) 70% PHB+30% PBAT and F) Neat PHB (all compositions are in weight %).

PHB, owning to its high stiffness, is extremely brittle and hence has very low elongation (~3%). This makes it difficult to fabricate films or sheets from PHB. This drawback is overcome by adding PBAT (elongation 764%). The percent elongation of the blend did not increase until 50% PBAT content (FIG. 15) and at 60% PBAT, the blend shows very high elongation (388%). This combination is ideal for making films and sheets for packaging applications.

Figure 16:
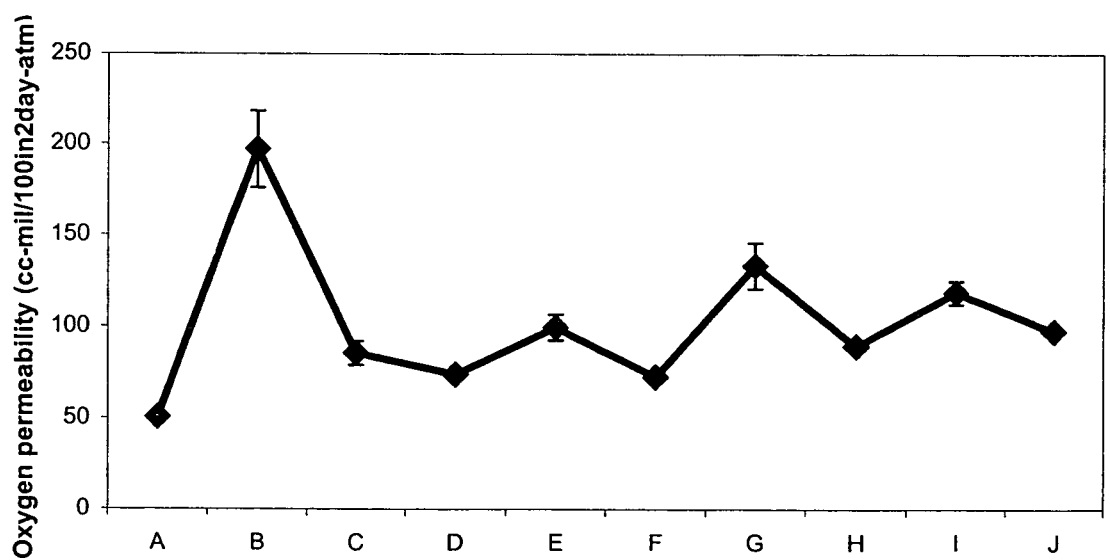
FIG. 16 is a graph showing oxygen barrier data of PHB-PBAT blends and their nanocomposites A) Neat PHB (compression molded film), B) Neat PBAT, C) 70% PHB+30% PBAT, D) 66.5% PHB+28.5% PBAT+5% CLOISITE® 30B, E) 50% PHB+50% PBAT, F) 47.5% PHB+47.5% PBAT+5% CLOISITE® 30B, G) 40% PHB+60% PBAT, H) 38% PHB+57% PBAT+5% CLOISITE® 30B, I) 30% PHB+70% PBAT and J) 28.5% PHB+66.5% PBAT+5% CLOISITE® 30B, (all compositions are in weight %).
Figure 17:
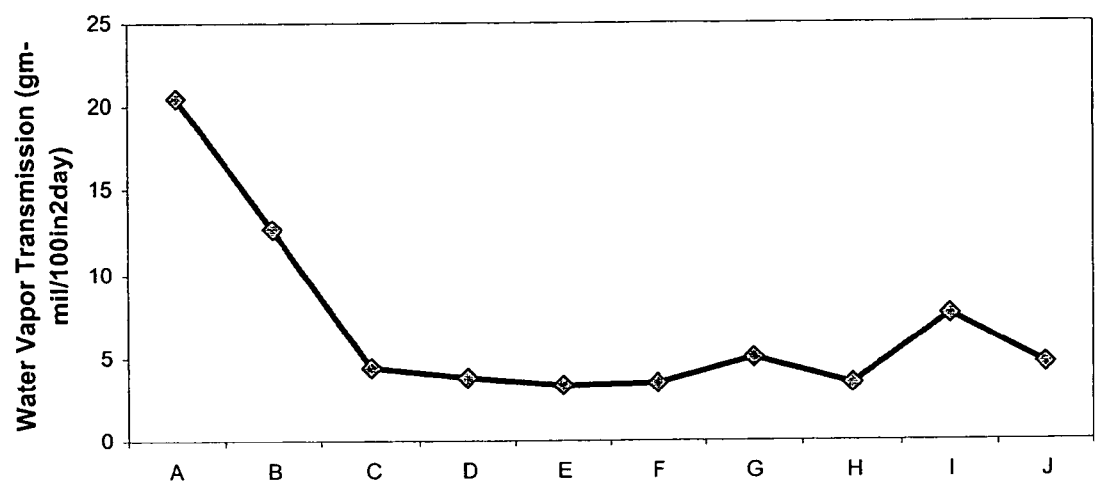
FIG. 17 is a graph showing water vapor barrier data of PHB-PBAT blends and their nanocomposites A) Neat PHB (compression molded film), B) Neat PBAT, C) 70% PHB+ 30% PBAT, D) 66.5% PHB+28.5% PBAT+5% CLOISITE® 30B, E) 50% PHB+50% PBAT, F) 47.5% PHB+47.5% PBAT+5% CLOISITE® 30B, G) 40% PHB+60% PBAT, H) 38% PHB+57% PBAT+5% CLOISITE® 30B, I) 30% PHB+ 70% PBAT and J) 28.5% PHB+66.5% PBAT+5% CLOISITE® 30B, (all compositions are in weight %).

The barrier properties of the blown films and their nanocomposites were tested on the OXTRAN and PERMATRAN (FIGS. 16 and 17): PHB has better oxygen barrier than PBAT but can not be made into film due to its poor elongation. PBAT has low barrier to oxygen and this was overcome by addition of PHB. The 40 wt % PHB/60wt % PBAT blend initially shows lower oxygen barrier than pure PHB but addition of nanoclay makes it better than PHB. This combination is ideal for film making (requisite mechanical properties) and shows oxygen barrier between that of polyolefins (LDPE, HDPE, OPP, PS) and Nylon (Table 8).

The water vapor barrier of both PBAT and PHB are good (FIG. 17) but blending further improves this to give a material with water barrier better than polyolefins and polyesters. The nanoclay addition also increases the barrier significantly.

Thus, the present invention provides:
  a. Optimum combination of PLLA (60 wt. %) and PBAT (40 wt. %) to give a blend with requisite stiffness-toughness balance;
  b. Nanocomposites of a specific compatible clay (CLOISITE® 25A) with PLLA-PBAT blend;

c. Optimum combination of PHB (40 wt. %) and PBAT (60 wt. %) to give a blend with requisite stiffness-toughness balance;
d. Ability to fabricate blown films of PHB-PBAT and PLLA-PBAT blends and their nanocomposites;
e. Nanocomposites of a specific compatible clay (CLOISITE® 30B) with PHB-PBAT blend;
f. Elongation of blown film of PLLA-PBAT blended nanocomposite (CLOISITE® 25A) better than that of neat PLLA-PBAT blended blown film;
g. Oxygen barrier of molded PLLA-PBAT blend films comparable to that of oriented polyolefins;
h. Oxygen barrier of molded PLLA-PBAT blend nanocomposites films better than oriented polypropylene films;
i. Barrier properties of blown film of PLLA-PBAT blend and its nanocomposite better than that of respective compression molded PLLA-PBAT blend film and its nanocomposites film;
j. Oxygen barrier of PHB-PBAT films and nanocomposites are superior to polyolefins;

The specific organic modified clays are synergistic to enhancement of barrier properties. The multilayer plastic films currently used for gas and water vapor barrier purposes can thus be replaced by a monolayer of plastic nanocomposite film. Green/Biobased polymer-clay nanocomposite technologies described in this invention have improved oxygen and moisture barrier properties.

Blending of a biobased biodegradable polymer and a petroleum-based biodegradable polymer creates a material with high bio-content to satisfy environmental and sustainability issues. High/good barrier are achieved by adding a nanoclay, but improvements are only achieved if optimum dispersion and compatibility are created. Clay is inherently hydrophilic and hence does not mix with the organic polymer matrix. This leads to agglomeration and poor properties and this has to be overcome by specifically modifying the clay surface. Performance limitations and high cost however, have limited these biopolymers and biodegradable polymers to niche markets. Nano-reinforcements of such materials with specific organo-clays create new value-added applications and lead to more usage, which will subsequently reduce the cost.

Figure 18:
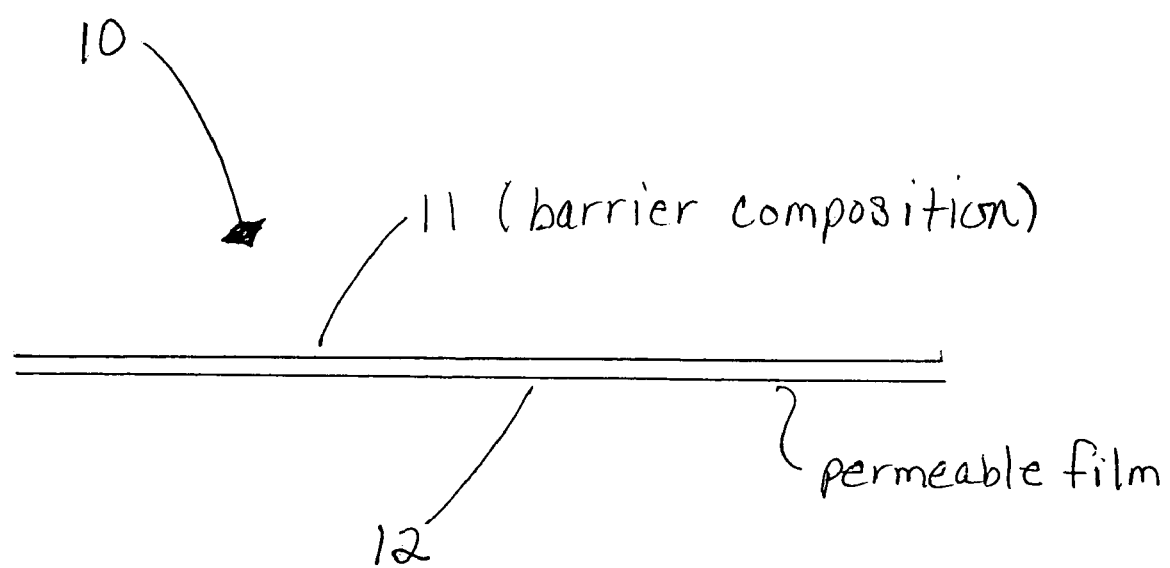
FIG. 18 shows a laminate film 11 of the barrier composition and a permeable film 12.

FIG. 18 shows a laminate 10 with a film 11 of the new composition laminated (bonded) to a film of another polymer such as poly-(butylene adipate-co-terephthalate) (PBAT) used for beverage containers.

It is intended that the foregoing description be only illustrative of the present invention and that the present invention be limited only by the hereinafter appended claims.

We claim:

1. A composition which comprises: a reactively blended mixture of:
   (a) a first polymer which is polylactic acid (PLA);
   (b) a second polymer which is poly-(butylene adipate-co-terephthalate) (PBAT), wherein (i) the weight ratio of (a) to (b) is between about 70:30 and 30:70, (ii) the composition has a percent elongation in the break of between 6% and 568%, and (iii) the composition has an Izod impact between about 87 J/m and 665 J/m; and
   (c) a quaternary ammonium salt modified clay in an amount between about 1% and 10% by weight of (a) and (b), the quaternary ammonium salt comprising a methyl hydrogenated tallow, 2-ethylhexyl quaternary ammonium cation, wherein the composition has an oxygen permeability ranging from about 80 cc·mil/(100 in$^2$·day·atm) to about 180 cc·mil/(100 in$^2$·day·atm).

2. The composition of claim 1 as a blown film.

3. The composition of claim 1 as a molded product.

4. The composition of any one of claims 1, 2 or 3 wherein the composition:
   (i) contains the modified clay in an amount between about 2% and 7% by weight of the composition and
   (ii) provides a water and an oxygen transmission barrier as a film laminated to other polymers which have a greater transmission of oxygen and water.

5. The composition of any one of claims 1, 2 or 3 wherein the first polymer is a pure L isomeric form of the PLA.

6. The composition of any one of claims 1, 2 or 3 which has been reactively blended by extrusion.

7. The composition of any one of claims 1, 2 or 3 wherein the quaternary ammonium salt contains a methyl sulfate anion.

8. The composition of claim 1 wherein the composition is in the form of a film.

9. The composition of claim 1 or claim 8 wherein the composition has an oxygen permeability ranging from about 80 cc·mil/(100 in$^2$·day·atm) to about 160 cc·mil/(100 in$^2$·day·atm).

10. A composition which comprises: a reactively blended mixture of:
    (a) a first polymer which is polylactic acid (PLA);
    (b) a second polymer which is poly-(butylene adipate-co-terephthalate) (PBAT), wherein (i) the weight ratio of (a) to (b) is between about 70:30 and 30:70, (ii) the composition has a percent elongation in the break of between 6% and 568%, and (iii) the composition has an Izod impact between about 87 J/m and 665 J/m; and
    (c) an organically modified clay in an amount between about 1% and 10% by weight of (a) and (b);
    wherein the composition is in the form of a film, wherein the composition has an oxygen permeability ranging from about 80 cc·mil/(100 in$^2$·day·atm) to about 180 cc·mil/(100 in$^2$·day·atm).

11. The composition of claim 10 wherein the organically modified clay comprises an organically modified montmorillonite.

12. The composition of claim 10 wherein the composition has an oxygen permeability ranging from about 80 cc·mil/(100 in$^2$·day·atm) to about 160 cc·mil/(100 in$^2$·day·atm).

* * * * *

UNITED STATES PATENT AND TRADEMARK OFFICE
CERTIFICATE OF CORRECTION

PATENT NO. : 7,619,025 B2  Page 1 of 1
APPLICATION NO. : 11/502971
DATED : November 17, 2009
INVENTOR(S) : Amar K. Mohanty et al.

It is certified that error appears in the above-identified patent and that said Letters Patent is hereby corrected as shown below:

Column 8, line 33, "PLLA/PABT" should be --PLLA/PBAT--.

Column 9, line 50, "PLLA/PABT" should be --PLLA/PBAT--.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,619,025 B2 | Page 1 of 1 |
| APPLICATION NO. | : 11/502971 | |
| DATED | : November 17, 2009 | |
| INVENTOR(S) | : Amar K. Mohanty et al. | |

It is certified that error appears in the above-identified patent and that said Letters Patent is hereby corrected as shown below:

In the Specification

In column 1, line 20, please delete:

"None"

and insert:

-- This invention was made with government support under RD83090401 awarded by the Environmental Protection Agency. The government has certain rights in the invention. --

Signed and Sealed this
Eleventh Day of March, 2014

Michelle K. Lee
*Deputy Director of the United States Patent and Trademark Office*